ABRAHAM F. WOLF.

Dinner Pot.

No. 124,775.  Patented March 19, 1872.

Witnesses.
Wm Howard
H L Perrine

Inventor.
Abraham F. Wolf
By L S Johnston & Bro
his attorneys

UNITED STATES PATENT OFFICE.

ABRAHAM F. WOLF, OF BEAVER FALLS, PENNSYLVANIA.

IMPROVEMENT IN DINNER-POTS.

Specification forming part of Letters Patent No. 124,775, dated March 19, 1872.

Specification describing certain Improvements in Dinner-Pots, as a new article of manufacture, invented by ABRAHAM F. WOLF, of Beaver Falls, Beaver county, State of Pennsylvania.

The nature of my invention consists in providing a new article of manufacture—viz., a dinner-pot with a lug cast on the side of the pot, said lug consisting of a half disk with a quarter disk arranged on the half disk midway between the ends of chord and arc of the disk, as shown in the accompanying drawing, whereby strength is obtained for the lug with but little stock, and economy of room, said lug being provided with an opening for a detachable handle.

Figure 1:
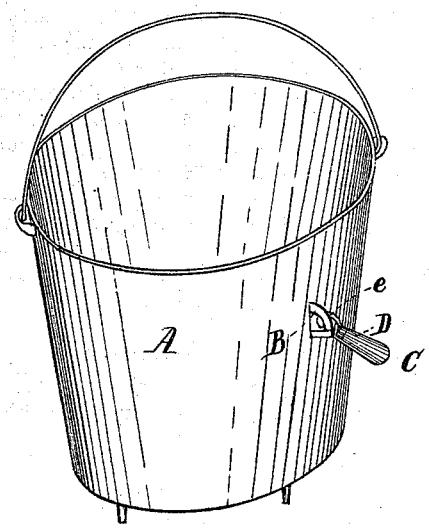
Figure 2:
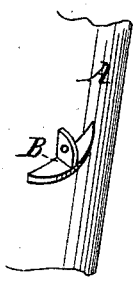
Figure 3:
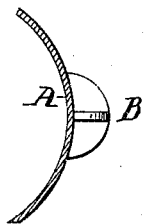

In the accompanying drawing, A represents an ordinary dinner-pot. B represents the lug, and C its detachable handle, the part D of which is constructed of wood, and its hook $e$ of wire. The form of the lug is clearly shown in Figs. 2 and 3.

I wish it clearly understood that I do not claim, broadly, a dinner-pot with a lug cast on the side of it.

The advantage of a dinner-pot provided with a lug and detachable handle will be apparent to every good housewife who has to manipulate pots in the cooking department.

What I claim is—

A new article of manufacture—viz., a dinner-pot provided with lug B and detachable handle C, constructed as hereinbefore described.

A. F. WOLF.

Witnesses:
 A. C. JOHNSTON,
 JAMES J. JOHNSTON.